(12) United States Patent
Nah et al.

(10) Patent No.: US 11,666,853 B2
(45) Date of Patent: Jun. 6, 2023

(54) HIGHLY EFFICIENT $CO_2$ ABSORBENT COMPOSITION AND METHOD FOR PREPARING THE SAME

(71) Applicants: KOREA INSTITUTE OF SCIENCE AND TECHNOLOGY, Seoul (KR); KOREA LAND & HOUSING CORPORATION, Jinju-si (KR)

(72) Inventors: In Wook Nah, Seoul (KR); Jae Ik Kim, Seoul (KR); Soon Jong Kwak, Seoul (KR); In Hwan Oh, Seoul (KR); Daeseung Kyung, Daejeon (KR); Youngjong Sim, Seongnam-si (KR); Yeongmin Kim, Daejeon (KR); Han-Guen Ahn, Yongin-si (KR); Sang-Ick Choi, Sejong-si (KR)

(73) Assignees: KOREA INSTITUTE OF SCIENCE AND TECHNOLOGY, Seoul (KR); KOREA LAND & HOUSING CORPORATION, Jinju-si (KR)

(*) Notice: Subject to any disclaimer, the term of this patent is extended or adjusted under 35 U.S.C. 154(b) by 165 days.

(21) Appl. No.: 17/175,705

(22) Filed: Feb. 15, 2021

(65) Prior Publication Data

US 2022/0233997 A1 Jul. 28, 2022

(30) Foreign Application Priority Data

Jan. 27, 2021 (KR) .................. 10-2021-0011734

(51) Int. Cl.
B01D 53/14 (2006.01)
(52) U.S. Cl.
CPC ..... B01D 53/1493 (2013.01); B01D 53/1475 (2013.01); *B01D 2252/2041* (2013.01);
(Continued)

(58) Field of Classification Search
CPC ........... B01D 53/1475; B01D 53/1493; B01D 2252/2041; B01D 2252/20415;
(Continued)

(56) References Cited

U.S. PATENT DOCUMENTS

| 2015/0007728 A1 | 1/2015 | Higashii et al. |
| 2016/0243499 A1 | 8/2016 | Hur et al. |

FOREIGN PATENT DOCUMENTS

| JP | 6343858 A | 12/1994 |
| JP | 3197173 B2 | 8/2001 |

(Continued)

OTHER PUBLICATIONS

Jung-Yeon Park et al., "Effect of steric hindrance on carbon dioxide absorption into new amine solutions: thermodynamic and spectroscopic verification through solubility and NMR analysis," Environmental Science and Fechnology, 2003, pp. 1670-1675, vol. 37, No. 8.

(Continued)

*Primary Examiner* — Anita Nassiri-Motlagh
(74) *Attorney, Agent, or Firm* — Cantor Colburn LLP (57) ABSTRACT

Disclosed are a carbon dioxide absorbent composition in which an N-alkylaminoalkanol; a polyhydroxyamine-based compound; and ethylenediamine and/or diethylenetriamine are mixed, a method for preparing the same, and a method and an apparatus for carbon dioxide absorption/separation using the same. Since the carbon dioxide absorbent according to the present disclosure has superior carbon dioxide absorption capacity and remarkably lower absorbent recycling temperature as compared to the existing absorbents such as monoethanolamine, etc., total energy consumption in the capturing process can be reduced greatly. In addition, (Continued)

since carbon dioxide is recovered at low recycling temperature, contamination by water or absorbent vapor may be prevented.

16 Claims, 4 Drawing Sheets

(52) U.S. Cl.
CPC .............. *B01D 2252/20415* (2013.01); *B01D 2252/20421* (2013.01); *B01D 2252/20484* (2013.01); *B01D 2257/504* (2013.01); *B01D 2258/01* (2013.01); *B01D 2258/05* (2013.01)

(58) Field of Classification Search
CPC ........... B01D 2252/20421; B01D 2252/20484; B01D 2257/504; B01D 2258/05
USPC ....................................................... 423/220
See application file for complete search history.

(56) References Cited

FOREIGN PATENT DOCUMENTS

| KR | 10-1999-0050314 A | 7/1999 |
| KR | 10-2014-0120940 A | 10/2014 |
| KR | 10-2016-0101696 A | 8/2016 |
| KR | 10-2019-0125734 A | 11/2019 |
| KR | 10-2020-0021319 A | 2/2020 |
| WO | 2004089512 A1 | 10/2004 |
| WO | 2019/212208 A1 | 11/2019 |

OTHER PUBLICATIONS

Pailin Muchan et al., "Effect of Number of Hydroxyl Group in Sterically Hindered Alkanolamine on CO2 Capture Activity," Energy Procedia, 2017, pp. 1966-1972, vol. 114.
The extended European Search Report for EP Application No. 21156778.9 dated Aug. 12, 2021.

HIGHLY EFFICIENT CO₂ ABSORBENT COMPOSITION AND METHOD FOR PREPARING THE SAME

CROSS-REFERENCE TO RELATED APPLICATION

This application claims the priority of Korean Patent Application No. 10-2021-0011734, filed on Jan. 27, 2021, and all the benefits accruing therefrom under 35 U.S.C. § 119, the contents of which in its entirety are herein incorporated by reference.

BACKGROUND

1. Field

The present disclosure relates to a carbon dioxide capture technology, more particularly to a high-performance absorbent composition for carbon dioxide capture, with superior carbon dioxide absorption capacity, absorption rate and recyclability, and a method and an apparatus for carbon dioxide capture using the same.

2. Description of the Related Art

Chemical absorption using amine-based aqueous solutions is the most effective method for removing carbon dioxide from gas mixtures generated in hydrogen, steel and cement production processes, flue gases exhausted from power plants using fossil fuels, natural gas, etc.

As chemical absorbents, aqueous solutions of amines such as monoethanolamine (MEA), diethanolamine (DEA), etc. are being studied the most, because the amine-based absorbents easily form stable carbamate compounds by reacting with carbon dioxide and the carbamate compounds are thermally decomposed to carbon dioxide and amines, thus allowing recycling of the alkanolamine absorbents.

However, this process has some serious problems, including the performance degradation of the absorbents due to the generation and decomposition of byproducts owing to impurities included in flue gas, such as $NO_x$, $SO_x$ and oxygen, and corrosion of equipment resulting therefrom, excessive recycling energy consumption due to high recycling temperature of 120° C. or above owing to the high thermal and chemical stability of the carbamate produced from the reaction with carbon dioxide, excessive volatilization loss of alkanolamine due to the high recycling temperature and replenishment of the absorbent to compensate for the loss, contamination of the separated carbon dioxide during recycling due to the low vapor pressure of the absorbent, and so forth.

In order to make up for the disadvantages of the amine-based aqueous solution absorbents, methods of physically absorbing carbon dioxide using organic solvents such as Selexol, Ifpexol, NFM, etc. have been reported. The most important advantage of the organic solvent absorbents is that, because carbon dioxide absorption is achieved only by the physical interaction between the absorption solvent and carbon dioxide rather than by chemical bonding as in the amine-based aqueous solutions, much lower energy is required for carbon dioxide recovery and solvent recycling. Indeed, whereas an energy-intensive, high-temperature deaeration process is necessary for carbon dioxide recovery and absorbent recycling when the amine-based aqueous solution absorbent is used, the physical absorption allows the recovery of carbon dioxide dissolved in the solvent only with the change in pressure without increasing temperature.

However, since the physical absorbents exhibit much lower carbon dioxide absorption capacity than the amine-based absorbents when carbon dioxide is separated from low-pressure flue gas, large-sized equipment is necessary to increase the recycling rate of the absorbent. Recently, the development of new chemical absorbents with high thermal and chemical stability and low vapor pressure, which are capable of overcoming the disadvantages of the existing amine-based absorbents and organic solvent absorbents, is being studied. In this regard, use of an alkanolamine with steric hindrance around the amine group of the alkanolamine as an absorbent is studied in an attempt to reduce the recycling energy of the chemical absorbent. A representative example is the primary amine 2-amino-2-methyl-1-propanol (AMP). Because AMP forms a bicarbonate compound, recycling of which is easier than carbamate, by reacting with carbon dioxide, the recycling energy is advantageously lower by 30% as compared to MEA. However, the carbon dioxide absorption rate is lower than 50% of that of MEA.

As a method of increasing the absorption rate of AMP, Mitsubishi Heavy Industries and Kansai Electric Power Co. made a joint effort to develop a new absorbent prepared by adding piperazine, which is a secondary cycloamine, to AMP (Japanese Patent No. 3197173). However, in this method, an excessive amount of piperazine is used such that precipitation occurs after carbon dioxide absorption and, when piperazine is reacted with carbon dioxide, stable carbamate compounds are formed in addition to bicarbonates, which makes recycling difficult.

Further, although a method of using an alkali carbonate such as sodium carbonate, potassium carbonate, etc. as a carbon dioxide absorbent instead of a primary alkanolamine absorbent such as MEA is also known, the method has the problem of slow carbon dioxide absorption rate. As a method of increasing the carbon dioxide absorption rate, International Patent Publication No. WO2004-089512 A1 reports that the carbon dioxide absorption rate of potassium carbonate is increased greatly when piperazine or its derivative is added to potassium carbonate. However, precipitation occurring when carbonate is used still remains as problems to be solved.

SUMMARY

In an aspect, the present disclosure is directed to providing a water-soluble organic absorbent with high durability, which allows carbon dioxide capture with high carbon dioxide absorption capacity under low recycling temperature conditions, a method for preparing the same, and a method and an apparatus for carbon dioxide capture using the same.

Exemplary embodiments of the present disclosure provide a carbon dioxide absorbent composition including: an N-alkylaminoalkanol represented by [Chemical Formula 1]; one or more polyhydroxyamine-based compound selected from a group consisting of polyhydroxyamine-based compounds represented by [Chemical Formula 2] to [Chemical Formula 4]; and one or more selected from a group consisting of ethylenediamine and diethylenetriamine.

[Chemical Formula 1]

In [Chemical Formula 1], n and m are integers from 1 to 10, and R is hydrogen (H), methyl (—CH₃), ethyl (—CH₂CH₃), propyl (—CH₂CH₂CH₃), hydroxymethyl (HO—CH₂—), hydroxyethyl (HO—CH₂CH₂—), hydroxypropyl (HO—CH₂CH₂CH₂—), C4-C10 alkyl, C4-C10 cycloalkyl, C4-C10 hydroxyalkyl or C4-C10 hydroxycycloalkyl.

[Chemical Formula 2]

[Chemical Formula 3]

[Chemical Formula 4]

In [Chemical Formula 2] to [Chemical Formula 4], X is one of Cl, Br, I and OH, and the repeating unit n is from 1 to 10.

Exemplary embodiments of the present disclosure also provide a method for preparing a carbon dioxide absorbent composition, which includes a step of dissolving and mixing the N-alkylaminoalkanol of [Chemical Formula 1]; the one or more polyhydroxyamine-based compound selected from a group consisting of the polyhydroxyamine-based compounds represented by [Chemical Formula 2] to [Chemical Formula 4]; and the one or more selected from a group consisting of ethylenediamine and diethylenetriamine in a solvent.

Exemplary embodiments of the present disclosure also provide a method and an apparatus for capturing carbon dioxide using the carbon dioxide absorbent.

According to exemplary embodiments of the present disclosure, a carbon dioxide absorbent in which an N-alkylaminoalkanol, a polyhydroxyamine-based compound and one or more of ethylenediamine and diethylenetriamine is mixed exhibits high carbon dioxide absorption capacity and fast absorption rate. In addition, due to remarkably lower absorbent recycling temperature as compared to the existing absorbent, total energy consumption of the absorption process can be reduced greatly and initial absorption capacity can be maintained almost even after repeated absorption and deaeration.

BRIEF DESCRIPTION OF THE DRAWINGS

The above and other aspects, features and advantages of the disclosed example embodiments will be more apparent from the following detailed description taken in conjunction with the accompanying drawings in which.

DETAILED DESCRIPTION

Exemplary embodiments are described more fully hereinafter. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of features and techniques may be omitted to more clearly disclose example embodiments.

The terminology used herein is for the purpose of describing particular embodiments only and is not intended to be limiting of the invention. As used herein, the singular forms "a," "an" and "the" are intended to include the plural forms as well, unless the context clearly indicates otherwise. Furthermore, the use of the terms a, an, etc. do not denote a limitation of quantity, but rather denote the presence of at least one of the referenced item. The terms "first," "second," and the like do not imply any particular order, but are included to identify individual elements. Moreover, the use of the terms first, second, etc. do not denote any order or importance, but rather the terms first, second, etc. are used to distinguished one element from another.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Definition of Terms

The term "normal pressure" used in the present disclosure refers to 1 atm as "atmospheric pressure".

In the present disclosure, a carbon dioxide absorbent composition may be simply referred to as a carbon dioxide absorbent.

Description of Exemplary Embodiments

Hereinafter, the exemplary embodiments of the present disclosure are described in detail.

Exemplary embodiments of the present disclosure provide a carbon dioxide absorbent composition including: an N-alkylaminoalkanol represented by [Chemical Formula 1]; one or more polyhydroxyamine-based compound selected from a group consisting of polyhydroxyamine-based compounds represented by [Chemical Formula 2] to [Chemical Formula 4]; and one or more selected from a group consisting of ethylenediamine and diethylenetriamine.

[Chemical Formula 1]

In [Chemical Formula 1], n and m are integers from 1 to 10, and R is hydrogen (H), methyl (—CH$_3$), ethyl (—CH$_2$CH$_3$), propyl (—CH$_2$CH$_2$CH$_3$), hydroxymethyl (HO—CH$_2$—), hydroxyethyl (HO—CH$_2$CH$_2$—), hydroxypropyl (HO—CH$_2$CH$_2$CH$_2$—), C4-C10 alkyl, C4-C10 cycloalkyl, C4-C10 hydroxyalkyl or C4-C10 hydroxycycloalkyl.

[Chemical Formula 2]

[Chemical Formula 3]

[Chemical Formula 4]

In [Chemical Formula 2] to [Chemical Formula 4], X is one of Cl, Br, I and OH, and the repeating unit n is from 1 to 10.

In an exemplary embodiment, the absorbent composition may be a mixture of a solvent, specifically one or more selected from a group consisting of water, ethylene glycol, glycerol and n-butyl alcohol.

In an exemplary embodiment, the N-alkylaminoalkanol compound may be used in an amount of 1-70 wt %, specifically 5-50 wt %, based on 100 wt % of the absorbent composition, and the polyhydroxyamine-based compound may be used in an amount of 0.1-10 wt %, specifically 0.1-5 wt %, based on 100 wt % of the absorbent composition.

In an exemplary embodiment, the N-alkylaminoalkanol absorbent may be used in an amount of 1-70 wt %, specifically 5-50 wt %, based on 100 wt % of the absorbent composition. If it is used in an amount less than 5 wt %, absorption performance may decrease. And, if it is used in an amount exceeding 50 wt %, absorption may not be efficient due to increased viscosity.

In an exemplary embodiment, the polyhydroxyamine-based compound may be used in an amount of 0.1-10 wt %, specifically 0.1-5 wt %, based on 100 wt % of the absorbent composition. If it is used in an amount less than 0.1 wt %, absorption performance may decrease. If it is used in an amount exceeding 5 wt %, viscosity may increase or operation may be difficult due to precipitate formation.

In an exemplary embodiment, the one or more selected from a group consisting of ethylenediamine and diethylenetriamine may be used in an amount of 2-10 wt % based on 100 wt % of the absorbent composition.

In an exemplary embodiment, if the amount of the one or more selected from a group consisting of ethylenediamine and diethylenetriamine is less than 0.3-fold of the polyhydroxyamine-based compound based on weight, the reaction between the ethylenediamine and/or diethylenetriamine and the polyhydroxyamine-based compound may be incomplete. And, if the amount is more than 4-fold, unreacted ethylenediamine and/or unreacted diethylenetriamine may exist in excess.

Exemplary embodiments of the present disclosure also provide a method for preparing a carbon dioxide absorbent composition, which includes a step of dissolving and mixing the N-alkylaminoalkanol of [Chemical Formula 1]; the one or more polyhydroxyamine-based compound selected from a group consisting of the polyhydroxyamine-based compounds represented by [Chemical Formula 2] to [Chemical Formula 4]; and the one or more selected from a group consisting of ethylenediamine and diethylenetriamine in a solvent.

In an exemplary embodiment, the solvent may be specifically one or more selected from a group consisting of water, ethylene glycol, glycerol and n-butyl alcohol.

In an exemplary embodiment, the method may include a step of producing a polyhydroxyamine-based absorbent from an amine precursor, an aldehyde precursor, an acid or alkali, etc. through condensation.

In an exemplary embodiment, the amine precursor may be, for example, one or more of urea, melamine, dicyandiamide, cyanamide, guanidine, biguanidine, guanylurea, polycyclic guanidine, etc.

In an exemplary embodiment, the aldehyde precursor may be, for example, one or more of formaldehyde, acetaldehyde, propionaldehyde, butyraldehyde, glutaraldehyde, glyoxal, malondialdehyde, succindialdehyde, phthalaldehyde, etc.

In an exemplary embodiment, as an acid or alkali catalyst, one or more selected from HCl, HNO$_3$, NH$_4$OH, NH$_4$I, NH$_4$Br, NH$_4$Cl, etc. may be used.

Exemplary embodiments of the present disclosure also provide a method and an apparatus for capturing carbon dioxide using the carbon dioxide absorbent.

The method for carbon dioxide capture may include a step of absorbing carbon dioxide using a carbon dioxide absorbent in which the N-alkylaminoalkanol, the polyhydroxyamine-based compound and one or more selected from a group consisting of ethylenediamine and diethylenetriamine are mixed.

Specifically, in an exemplary embodiment, the method may include: a first step of absorbing carbon dioxide from a carbon dioxide-containing gas mixture using the carbon dioxide absorbent composition wherein the N-alkylaminoalkanol, the polyhydroxyamine-based compound and the one or more selected from a group consisting of ethylenediamine and diethylenetriamine are mixed; and a second step deaerating the absorbed carbon dioxide from the carbon dioxide absorbent.

The carbon dioxide absorbent in which the N-alkylaminoalkanol, the polyhydroxyamine-based compound and one or more selected from a group consisting of ethylenediamine and diethylenetriamine are mixed is advantageous over the existing absorbent such as monoethanolamine, etc. because recycling energy can be reduced greatly since a bicarbonate ($HCO_3$) compound that can be recycled easily is produced according to [Reaction Scheme 1] using water as a solvent and then an alkanolamine with steric hindrance is produced according to [Reaction Scheme 2].

[Reaction Scheme 1]

[Reaction Scheme 2]

Accordingly, by using the alkanolamine carbon dioxide absorbent with steric hindrance according to exemplary embodiments of the present disclosure, absorbent recycling is possible after carbon dioxide absorption even at low temperature. In addition, energy consumption in the overall absorption process can be reduced and corrosion, side reactions, absorbent loss, etc. resulting from high recycling temperature can be reduced greatly.

The carbon dioxide-containing gas mixture may include exhaust gas generated in chemical plants, power plants, steel companies, cement plants, etc., natural gas, biogas from sewage disposal plants, or the like.

In an exemplary embodiment, specifically, the absorption temperature in the first step may be 10-60° C.

In an exemplary embodiment, specifically, the absorption pressure in the first step may be from normal pressure to 30 atm.

In an exemplary embodiment, specifically, the deaeration temperature in the second step may be 70-100° C.

In an exemplary embodiment, specifically, the deaeration pressure in the second step may be normal pressure.

In an exemplary embodiment, when carbon dioxide is absorbed in the first step, the absorption temperature is 10-80° C., specifically 20-60° C. And, the absorption pressure is specifically from normal pressure to 50 atm, more specifically from normal pressure to 30 atm.

If the absorption temperature is above 80° C., carbon dioxide absorption amount may decrease because deaeration may occur at the same time. And, the absorption temperature below 10° C. is undesirable in terms of economic efficiency because an additional equipment is necessary to lower the temperature. In this aspect, an absorption temperature of 20-60° C. is preferred.

Since the pressure of an exhaust gas is normal pressure, it is the most economical that the absorption is performed at normal pressure. If the absorption pressure is higher than 50 atm, the absorption amount may increase rapidly but it is economically inefficient because an additional equipment such as a compressor is necessary to maintain the high pressure. In this aspect, a pressure range from normal pressure to 30 atm is preferred.

In an exemplary embodiment, the deaeration of the absorbed carbon dioxide in the second step may be performed at a temperature range of specifically 60-140° C., more specifically 70-100° C. And, the deaeration pressure may be normal pressure.

If the deaeration temperature is below 60° C., deaeration may not occur. And, if the deaeration temperature is above 140° C., the advantage of the absorbent according to the present disclosure may disappear because there is no significant difference in temperature from the existing absorbent. In this aspect, a temperature range of 70-100° C. is preferred.

It is difficult to perform the deaeration at high pressure. To maintain the high pressure, the vapor pressure of water has to be increased, which is economically unfavorable because high temperature is required. Accordingly, it is desired that the deaeration is performed at normal pressure.

Hereinafter, specific examples of the present disclosure are described in detail. However, the present disclosure is not limited by the following examples but may be embodied in various other forms within the scope of the appended claims. The following examples are provided such that the disclosure of the present disclosure is complete and those having ordinary knowledge in the art can easily carry out the present disclosure.

Comparative Example

A commercially available monoethanolamine carbon dioxide absorbent (purchased form Daejung Chemicals) was used as Comparative Example.

Examples

Preparation of Polyhydroxyamine-Based Compound

After adding 3.6 g of urea, 2.2 g of ammonium iodide and 5.2 g of glyoxal to a 3-necked flask equipped with a thermometer, a reflux condenser and a dropping funnel, the mixture was stirred at a reaction temperature of 75° C., at pH 3 for 2 hours. Then, condensation reaction was performed over 1 hour while adding 0.5 g of hydroxylamine as an amine compound, 1 g of isopropyl alcohol as a stabilizer and molecular weight modifier, and 5.2 g of glyoxal dropwise through a dropping funnel.

Figure 1A:
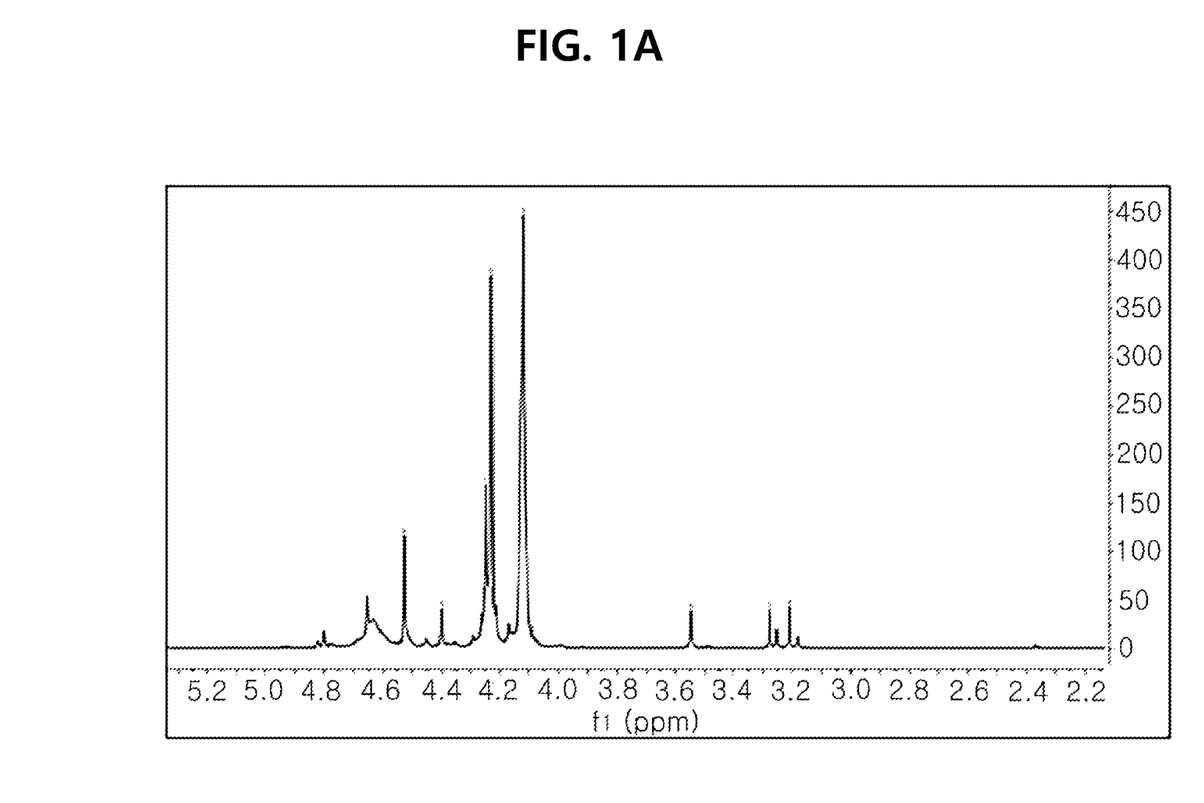
FIG. 1A shows the $^1$H NMR spectrum of a polyhydroxyamine-based compound obtained in an example of the present disclosure.
Figure 1B:
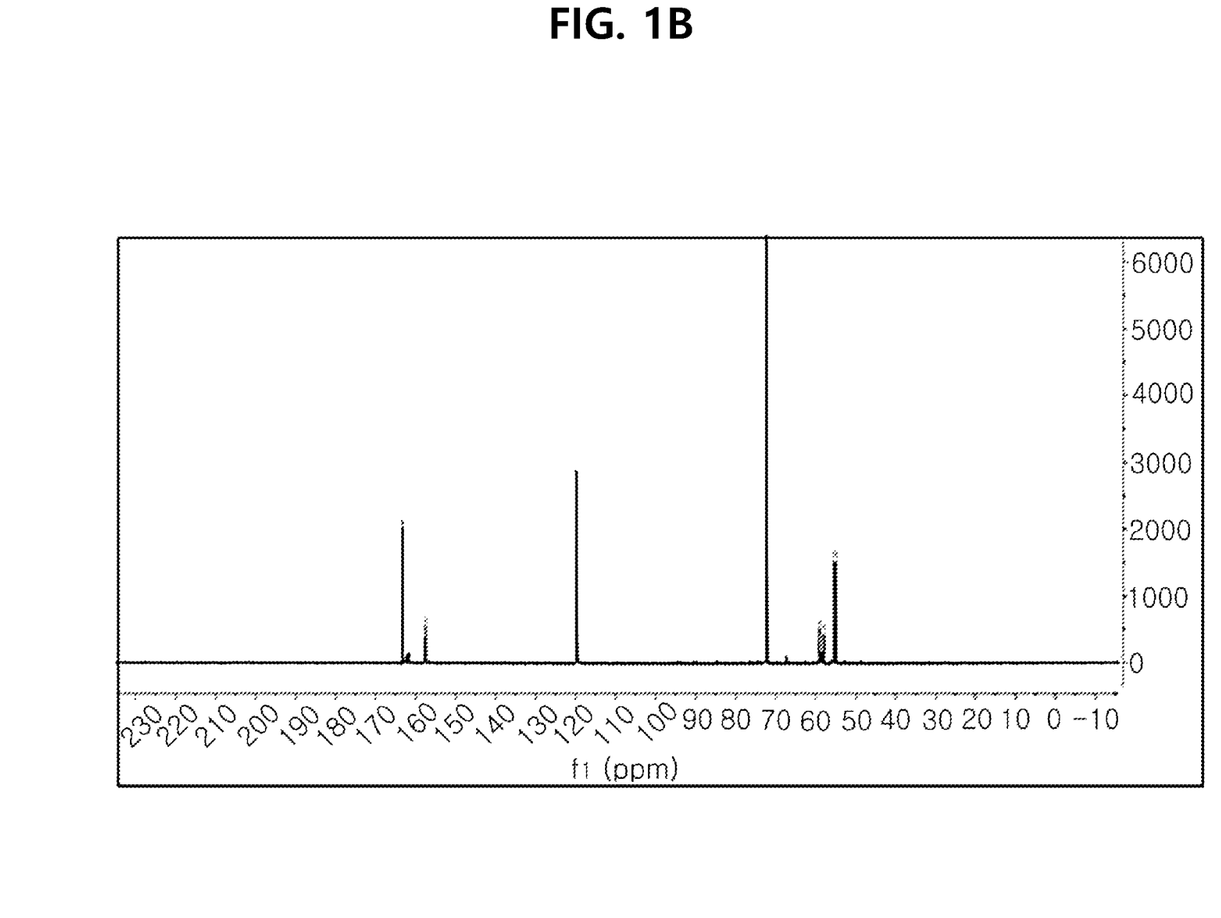
FIG. 1B shows the $^{13}$C NMR spectrum of the polyhydroxyamine-based compound.

FIG. 1A shows the $^1$H NMR spectrum of a polyhydroxyamine-based compound obtained in an example of the present disclosure, and FIG. 1B shows the $^{13}$C NMR spectrum of the polyhydroxyamine-based compound.

$^1$H NMR (600 MHz, deuterium oxide) δ 4.87-4.75 (m, 1H), 4.40 (s, 1H), 4.24 (d, J=11.1 Hz, 9H), 4.12 (s, 14H), 3.55 (s, 1H), 3.23 (dd, J=41.1, 14.3 Hz, 2H).

$^{13}$C NMR (151 MHz, deuterium oxide) δ 163.18, 157.32, 119.85, 119.57, 119.54, 72.09, 58.96, 57.88, 55.19.

Preparation of Carbon Dioxide Absorbent

Examples 1-8 were prepared as follows. 5 g of the prepared polyhydroxyamine-based compound and 2 g of ethylenediamine (purchased from Sigma-Aldrich) [Examples 1-7] or diethylenetriamine (purchased from Daejung Chemicals) [Example 8] were mixed with 63 g of water and completely dissolved while maintaining temperature at 80° C. for 1 hour. Then, an absorbent was prepared by mixing with 30 g of an N-alkylaminoalkanol (purchased from Sigma-Aldrich) described in Table 1.

Figure 2A:
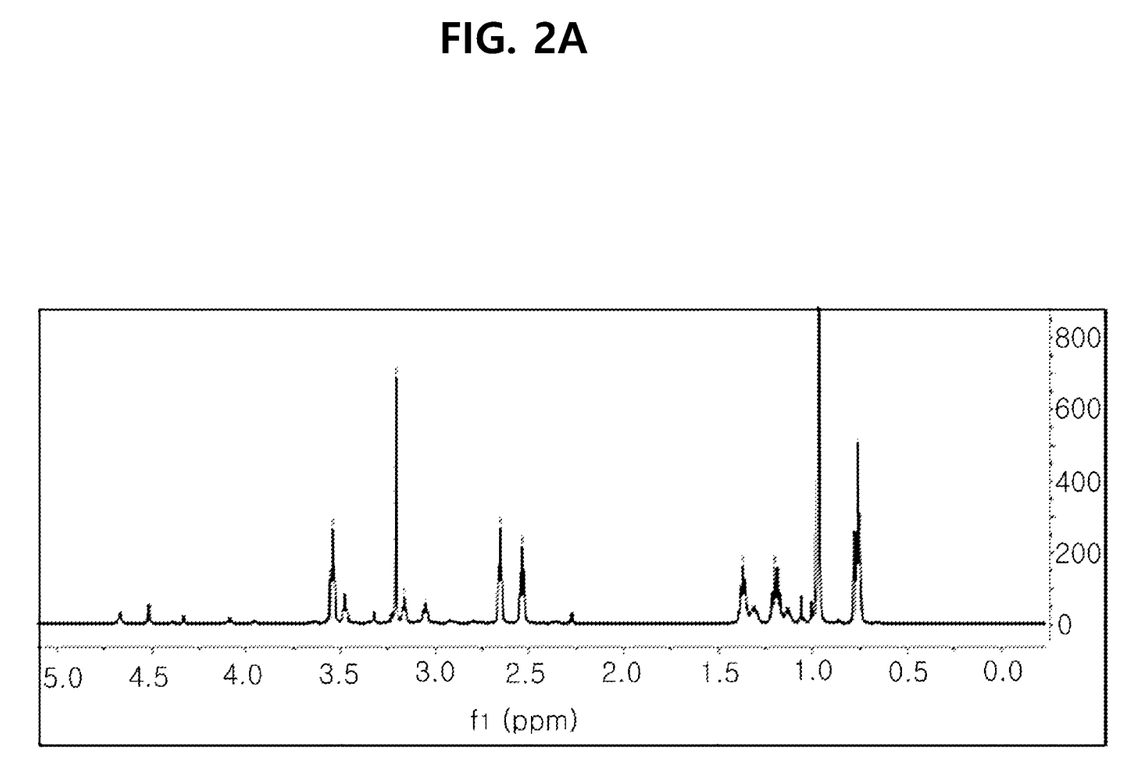
FIG. 2A shows the $^1$H NMR spectrum of a carbon dioxide absorbent obtained in an example of the present disclosure.
Figure 2B:
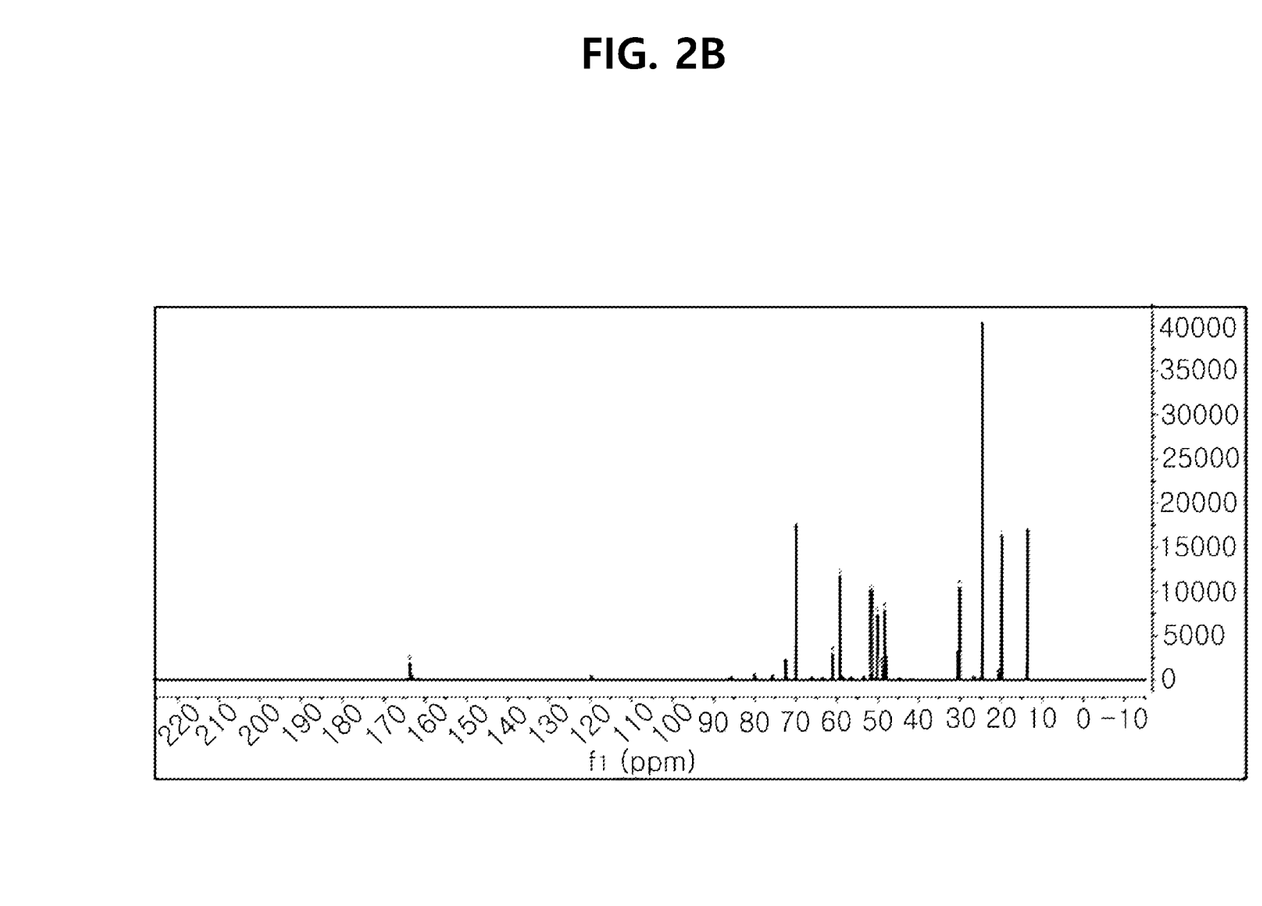
FIG. 2B shows the $^{13}$C NMR spectrum of the carbon dioxide absorbent.

FIG. 2A shows the $^1$H NMR spectrum of a carbon dioxide absorbent obtained in Example 6 of the present disclosure, and FIG. 2B shows the $^{13}$C NMR spectrum of the carbon dioxide absorbent obtained in Example 6 of the present disclosure.

$^1$H NMR (600 MHz, deuterium oxide) δ 3.55 (t, J=5.6 Hz, 3H), 3.48 (t, J=6.1 Hz, 1H), 3.21 (s, 3H), 3.16 (t, J=6.2 Hz, 1H), 3.05 (t, J=7.6 Hz, 1H), 2.66 (t, J=5.6 Hz, 3H), 2.54 (t, J=7.6 Hz, 3H), 1.37 (p, J=7.5 Hz, 3H), 1.31 (t, J=7.7 Hz, 1H), 1.19 (h, J=7.5 Hz, 3H), 1.13 (q, J=7.5 Hz, 1H), 1.06 (d, J=11.2 Hz, 0H), 0.97 (s, 9H), 0.76 (q, J=6.7, 6.1 Hz, 6H).

$^{13}$C NMR (151 MHz, deuterium oxide) δ 163.91, 69.95, 61.09, 59.19, 51.52, 50.13, 48.19, 47.81, 30.73, 30.16, 24.57, 19.90, 19.80, 13.69, 13.47.

Absorption/Recycling Capacity of Carbon Dioxide Absorbent Prepared by Mixing N-Alkylamino-Alkanol and Polyhydroxyamine-Based Compound with Ethylenediamine or Diethylenetriamine In order to compare the carbon dioxide absorption capacity of the carbon dioxide absorbent prepared by mixing the N-alkylamino-alkanol and the polyhydroxyamine-based compound with ethylenediamine, carbon dioxide absorption amount was measured after injecting a synthesis gas mimicking a power plant exhaust gas (carbon dioxide/nitrogen 10%) to 500 mL of the absorbent at room temperature, at a rate of 500 mL/min for 1 hour. After stirring at 90° C. for 30 minutes, the amount of deaerated carbon dioxide was measured. Then, carbon dioxide absorption/recycling test was performed at absorption/recycling temperatures of 25/90° C.

Table 1 shows the result of carbon dioxide absorption/recycling at 25/90° C. for the carbon dioxide absorbents according to the examples of the present disclosure.

As can be seen from Table 1, carbon dioxide could be deaerated from the carbon dioxide absorbent by controlling temperature only, without control of other external process conditions. In addition, it was confirmed that the carbon dioxide absorbent according to the present disclosure allows carbon dioxide absorption/recycling at relatively lower temperature as compared to the commercially available monoethanolamine carbon dioxide absorbent of Comparative Example with less energy consumption.

TABLE 1

| | Absorbent composition | | | | | |
|---|---|---|---|---|---|---|
| Ex. | N-alkylaminoalkanol (wt %) | Polyhydroxyamine-based compound (wt %)/ ethylenediamine or diethylenetriamine (wt %) | Water (wt %) | Carbon dioxide absorption capacity (gCO$_2$/100 mL) | Carbon dioxide reabsorption capacity (gCO$_2$/100 mL) | Carbon dioxide recycling rate (%) |
| 1 | N-(n-methyl)aminoethanol (30) | 5/2 [Polyhydroxyamine-based compound/ ethylenediamine]* | 63 | 12 | 6.6 | 55 |
| 2 | N-(n-ethyl)aminoethanol (30) | 5/2 [Polyhydroxyamine-based compound/ ethylenediamine]* | 63 | 10 | 5.8 | 58 |
| 3 | N-(n-butyl)aminoethanol (30) | 5/2 [Polyhydroxyamine-based compound/ ethylenediamine]* | 63 | 10 | 6.2 | 62 |
| 4 | N-(n-butyl)aminopropanol (30) | 5/2 [Polyhydroxyamine-based compound/ ethylenediamine]* | 63 | 11 | 7.2 | 65 |
| 5 | N-(n-butyl)-N-hydroxymethyl-aminoethanol (30) | 5/2 [Polyhydroxyamine-based compound/ ethylenediamine]* | 63 | 10 | 6.6 | 66 |
| 6 | N-(n-butyl)-N-hydroxyethyl- | 5/2 [Polyhydroxyamine- | 63 | 9 | 6.5 | 72 |

TABLE 1-continued

| Ex. | N-alkylaminoalkanol (wt %) | Polyhydroxyamine-based compound (wt %)/ethylenediamine or diethylenetriamine (wt %) | Water (wt %) | Carbon dioxide absorption capacity (gCO$_2$/100 mL) | Carbon dioxide reabsorption capacity (gCO$_2$/100 mL) | Carbon dioxide recycling rate (%) |
|---|---|---|---|---|---|---|
| | aminoethanol (30) | based compound/ ethylenediamine]* | | | | |
| 7 | N-(n-butyl)-N-(2-hydroxycyclo-propyl)aminoethanol (30) | 5/2 [Polyhydroxyamine-based compound/ ethylenediamine]* | 63 | 8 | 4.6 | 58 |
| 8 | N-(n-butyl)-N-(2-hydroxycyclo-propyl)aminoethanol (30) | 5/5 [Polyhydroxyamine-based compound/ diethylenetriamine]** | 60 | 7 | 6.5 | 60 |
| Comp. Ex. | Monoethanolamine (30) | | 70 | 12 | 2.9 | 24 |

*Polyhydroxyamine-based compound + ethylenediamine = 7 wt %.
*Polyhydroxyamine-based compound + diethylenetriamine = 10 wt %.

As can be seen from the above table, the carbon dioxide absorbent according to the exemplary embodiments of the present disclosure, in which the N-alkylamino-alkanol and the polyhydroxyamine-based compound are mixed with ethylenediamine, has high carbon dioxide absorption capacity and fast absorption rate. In addition, total energy consumption in the absorption process can be reduced greatly because the absorbent recycling temperature is remarkably lower than that of the existing absorbent. Accordingly, it is expected that it is applicable in various industries where a large amount of carbon dioxide is emitted and the captured carbon dioxide may be used in the synthesis of high value-added organic substances.

What is claimed is:

1. A carbon dioxide absorbent composition comprising:
   an N-alkylaminoalkanol represented by [Chemical Formula 1];
   one or more polyhydroxyamine-based compounds selected from a group consisting of polyhydroxyamine-based compounds represented by [Chemical Formula 2] to [Chemical Formula 4]; and
   one or more of ethylenediamine or diethylenetriamine:

[Chemical Formula 1]

wherein n and m are integers from 1 to 10, and
   R is hydrogen (H), methyl (—CH$_3$), ethyl (—CH$_2$CH$_3$), propyl (—CH$_2$CH$_2$CH$_3$), hydroxymethyl (HO—CH$_2$—), hydroxyethyl (HO—CH$_2$CH$_2$—), hydroxypropyl (HO—CH$_2$CH$_2$CH$_2$—), C4-C10 alkyl, C4-C10 cycloalkyl, C4-C10 hydroxyalkyl, or C4-C10 hydroxycycloalkyl,

[Chemical Formula 2]

[Chemical Formula 3]

[Chemical Formula 4]

wherein in [Chemical Formula 2] to [Chemical Formula 4], X is one of Cl, Br, I or OH, and n is from 1 to 10.

2. The carbon dioxide absorbent composition according to claim 1, wherein the absorbent composition further comprises one or more selected from a group consisting of water, ethylene glycol, glycerol and n-butyl alcohol.

3. The carbon dioxide absorbent composition according to claim 1, wherein the N-alkylaminoalkanol compound is present in an amount of 1-70 wt % based on 100 wt % of the absorbent composition.

4. The carbon dioxide absorbent composition according to claim 1, wherein the polyhydroxyamine-based compound is present in an amount of 0.1-10 wt % based on 100 wt % of the absorbent composition, and the one or more of ethylenediamine or diethylenetriamine is present in an amount of 2-10 wt % based on 100 wt % of the absorbent composition.

5. A method for preparing the carbon dioxide absorbent composition according to claim 1, comprising dissolving and mixing the N-alkylaminoalkanol of Chemical Formula 1 with the one or more polyhydroxyamine-based compounds of [Chemical Formula 2] to [Chemical Formula 4], and the one or more of ethylenediamine or diethylenetriamine, in a solvent.

6. The method for preparing the carbon dioxide absorbent composition according to claim 5, wherein the solvent is one or more selected from a group consisting of water, ethylene glycol, glycerol, and n-butyl alcohol.

7. The method for preparing the carbon dioxide absorbent composition according to claim 5, further comprising producing the polyhydroxyamine-based compounds from an amine precursor, an aldehyde precursor, and an acid or alkali through condensation.

8. A method for separating carbon dioxide from a gas mixture, the method comprising contacting the gas mixture that includes carbon dioxide with a carbon dioxide absorbent composition, absorbent composition comprises an N-alkylaminoalkanol represented by [Chemical Formula 1];

one or more polyhydroxyamine-based compounds selected from a group consisting of polyhydroxyamine-based compounds represented by [Chemical Formula 2] to [Chemical Formula 4]; and one or more of ethylenediamine or diethylenetriamine:

[Chemical Formula 1]

wherein n and m are integers from 1 to 10, and

R is hydrogen (H), methyl (—CH$_3$), ethyl (—CH$_2$CH$_3$), propyl (—CH$_2$CH$_2$CH$_3$), hydroxymethyl (HO—CH$_2$—), hydroxyethyl (HO—CH$_2$CH$_2$—), hydroxypropyl (HO—CH$_2$CH$_2$CH$_2$—), C4-C10 alkyl, C4-C10 cycloalkyl, C4-C10 hydroxyalkyl, or C4-C10 hydroxycycloalkyl;

[Chemical Formula 2]

[Chemical Formula 3]

[Chemical Formula 4]

wherein in [Chemical Formula 2] to [Chemical Formula 4], X is one of Cl, Br, I or OH, and n is from 1 to 10.

9. The method according to claim 8, further comprising desorption of the absorbed carbon dioxide from the carbon dioxide absorbent by raising the temperature of the absorbent.

10. The method according to claim 8, wherein carbamate is not formed in the absorption of carbon dioxide by the carbon dioxide absorbent composition.

11. The method according to claim 9, wherein the gas mixture is one or more selected from a group consisting of exhaust gas, natural gas, and sewage disposal plant biogas.

12. The method according to claim 9, wherein the contacting of the gas mixture with the carbon dioxide absorbent composition is conducted at a temperature in a range of 10° C. to −60° C.

13. The method according to claim 12, wherein the contacting of the gas mixture with the carbon dioxide absorbent composition is conducted at a pressure in a range of ambient pressure to 30 atm.

14. The method according to claim 13, wherein the description of the carbon dioxide from the absorbent composition is conducted at a temperature in a range of 70° C. to −100° C.

15. The method according to claim 14, wherein the desorption of the carbon dioxide is conducted at ambient pressure.

16. The carbon dioxide absorbent composition according to claim 1, the one or more of ethylenediamine or diethylenetriamine in total is present in an amount that is 0.3 time or more to less than 4 times the amount of the one or more polyhydroxyamine-based compounds in total.

\* \* \* \* \*